Dec. 20, 1927. 1,653,003
E. V. COULSTON
STOVE
Filed Jan. 7, 1924 2 Sheets-Sheet 1

INVENTOR
EARL V. COULSTON
BY
ATTORNEY.

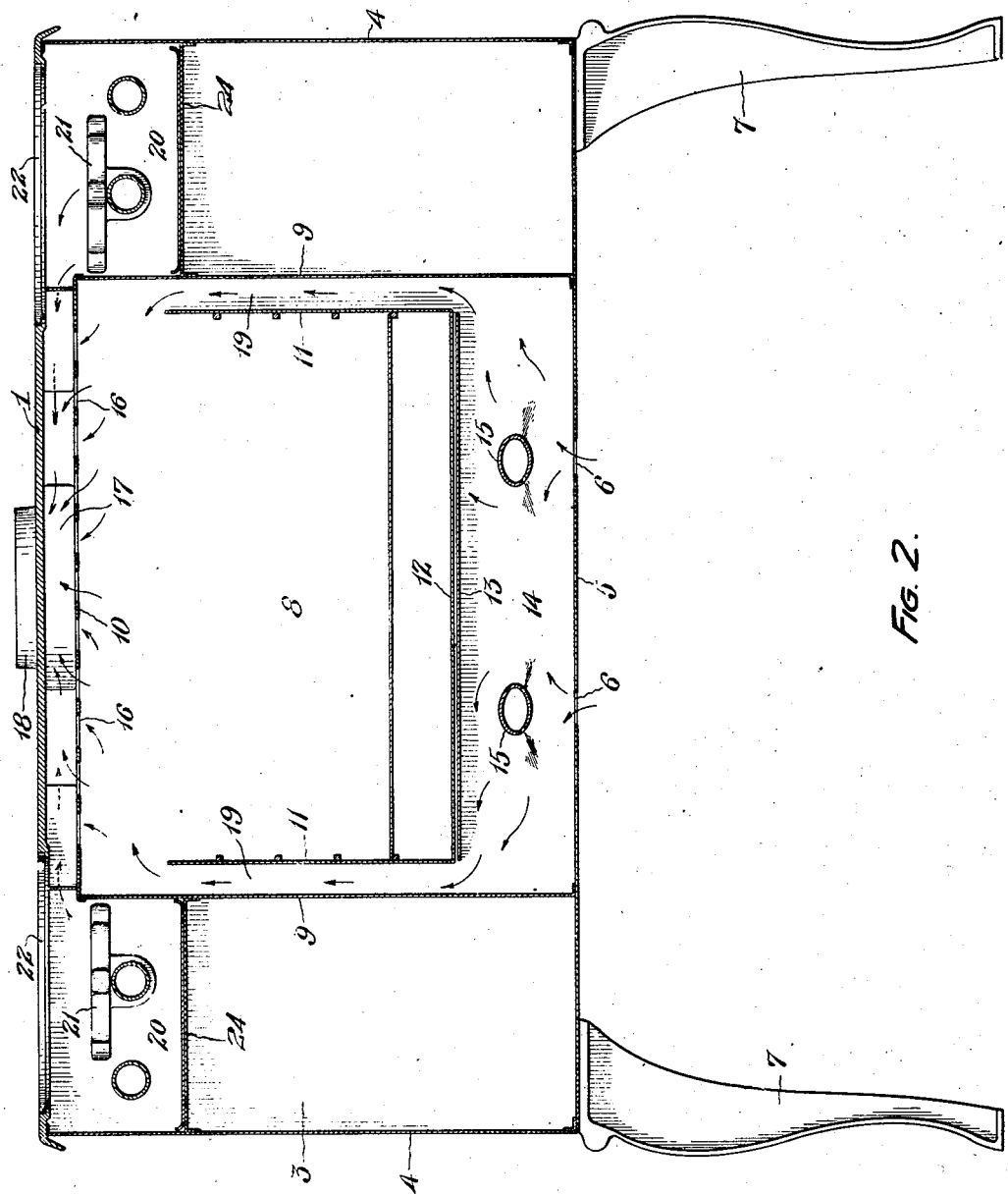

Patented Dec. 20, 1927.

1,653,003

UNITED STATES PATENT OFFICE.

EARL V. COULSTON, OF CLEVELAND HEIGHTS, OHIO.

STOVE.

Application filed January 7, 1924. Serial No. 684,708.

My invention relates to cooking stoves in which gas, oil, or similar material is used for fuel.

The general object of the invention is to provide a stove structure which will perform its functions in an efficient manner and which may be economically manufactured.

The said invention consists of means hereinafter fully described and particularly set forth in the claims.

Heretofore, in stoves of this character, the construction has been such that a comparatively small cooking surface was provided and a comparatively small top surface was provided suitable for keeping cooked foods warm. Furthermore, in such stoves the oven was either placed too low for convenience, or, if raised, occupied a large part of the lateral portion of the stove and, hence, restricted the cooking space. Furthermore, such stoves were constructed so that cooking efficiency could not be obtained without a burner being especially lighted therefor.

More specifically, the object of my invention is, first, to provide an enlarged cooking and heating surface while decreasing the horizontal dimensions of the stove; second, to bring the oven into a more convenient position; third, to utilize the heat of a given burner for cooking purposes at a place on the stove not immediately above such burner; and, fourth, to utilize the heat generated for specific application to the oven for cooking or warming purposes.

These objects are obtained in my construction primarily by utilizing the cooking top to form the upper and outer oven wall and extending such top laterally of the oven whereby a burner space or spaces may be provided immediately below such cooking top. These lateral burner spaces or burner space and the oven burner space are connected with the space intermediate of the cooking top and the inner top oven wall, and such intermediate space is connected with a suitable outlet in the stove frame, all as will be hereinafter more specifically pointed out.

The annexed drawings and the following description set for'h in detail certain means embodying my invention, the disclosed means; however, constituting but one of the various mechanical forms in which the principle of the invention may be employed.

In the said annexed drawings:

Fig. 2 represents a vertical longitudinal section.

Figure 1:
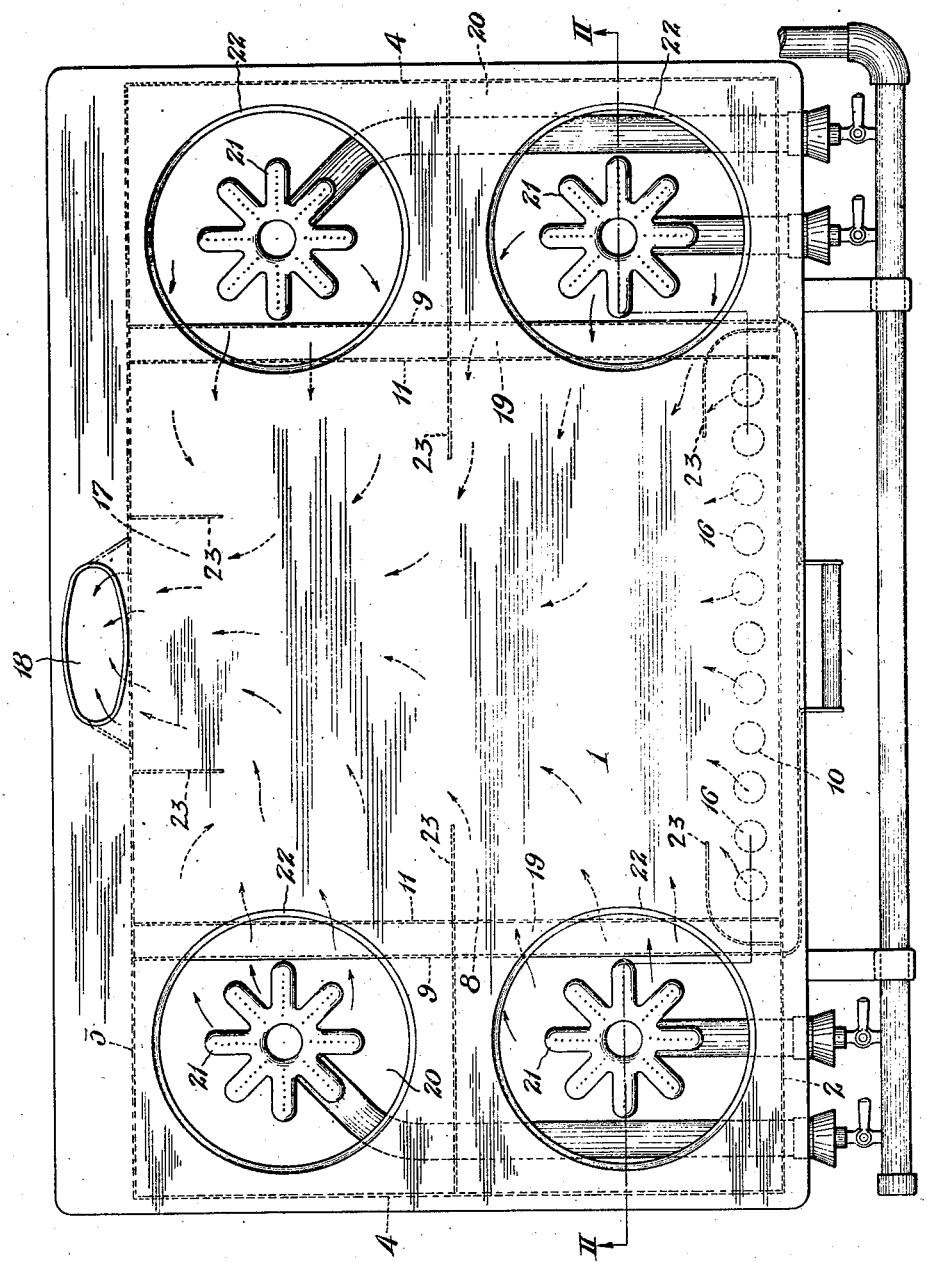
Figure 1 represents a plan of a stove embodying my invention.

The illustrated embodiment of my invention comprises a cooking-top 1; a suitable front wall 2, back wall 3, side walls 4—4, and the bottom wall 5, the latter being provided with suitable inlets 6—6. Suitable legs 7—7 are provided in the usual manner.

The oven 8 is provided with the primary lateral walls 9—9 which extend from front to rear of the stove, the inner wall 10, the secondary lateral walls 11—11, and the bottom wall 12, Fig. 2. A suitable baffle-plate 13 is provided beneath the bottom wall 12, and in the burner chamber 14 beneath the oven are placed one or more suitable burners 15, the inlets 6—6 furnishing air to said chamber, as will be understood.

The front of the top inner wall 10 is provided with perforations 16 and the space or flue 17 formed intermediately of the cooking-top 1 and the main top wall 10 is connected at the back with a suitable outlet or vent, 18, for the gases of combustion.

The vertical flue spaces 19—19 between the primary side-walls 9—9 and the secondary walls 11—11 of the oven, connect the upper part of the interior of the oven with the burner-chamber 14 and permit the gases of combustion to pass into such top portion of the oven through the perforations 16 into the space or flue 17 and out of the outlet or flue 18.

As shown in Fig. 2, the cooking-top 1 extends laterally of both sides of the oven, and beneath these extended portions are formed the burner-chambers 20—20, in which are suitably located the required number of burners 21. The bottom of each chamber 20 is formed by a horizontal plate 24 extending outwardly from the adjacent partition 9, and intermediately of the ends of the latter. These extended cooking-top portions are also provided with a corresponding number of openings 22 in which suitable removable lids may be placed. These last-named burner chambers 20 are connected directly with the intermediate top space or flue 17 as shown in Fig. 2.

The gases of combustion from the burners 21 pass directly into the said intermediate space 17, and from it into the outlet 18.

Projecting a short way into the flue space 17 are baffle plates 23 which serve to direct the gases from the several side burners and the gases passing from the lower burner through apertures 16 of the plate 10, toward the center of the cooking top, to effectively distribute the gases and heat the cooking top.

By means of the above described construction, it will therefore be seen that a cooking space is provided in the cooking-top 1 at each side of the oven and which is directly above the burners 21. The space between the extended portions of the cooking-top, being directly connected with the burner chambers 20, is heated by the gases of combustion generated therein, and is also heated by the gases of combustion generated in the oven burner-chamber 14. This intermediate portion of the cooking-top may therefore also be used for cooking as well as warming purposes. Furthermore, when the burners 21—21 are not, but when the oven is, in use, this intermediate portion of the cooking-top is heated by the oven burners and may be utilized for cooking or warming purposes, or both.

It will also be seen that the above construction eliminates burner chambers above the oven so that the latter may be raised in consequence, thereby causing the cooking-top to form the outer and upper wall of the oven.

It will be obvious to those skilled in the art that the described structure may be used with burners suitable for burning a liquid fuel such as kerosene, as readily as it may be for a stove using gas for its fuel.

What I claim is:

1. In a stove, the combination of a bottom, front, back and side walls; a cooking top supported by said side walls; vertical partition members inwardly spaced from the side walls and extending to within a short distance of the cooking top; a plate connecting the upper edges of said partition members and providing a space permanently open at opposite ends between said plate and cooking top for the passage of hot gases; an outlet opening at the rear of said space; burners beneath the lateral end portions of said cooking top and laterally of said partition members; and plates beneath the burners extending between said partition members and side walls and forming burner chambers.

2. In a stove, the combination of a bottom, front, back and side walls, a cooking top supported by said side walls; upright partition members extending from the bottom wall and having their upper ends respectively spaced from said cooking top; the latter extending laterally beyond the upper ends of said partition members; a burner beneath each of such extending portions of the cooking top; a plate connecting the upper ends of said partition members and forming a horizontal gas passage permanently open at both ends; an outlet opening from said passage; plates beneath the burners extending between the end walls and said partition members forming burner chambers; the permanently open ends of said gas passage communicating with said burner chambers.

3. In a stove, in combination, front, back, and end walls; a bottom wall and cooking top; vertical partitions spaced from the end walls and extending to a point near the cooking top; a horizontal plate vertically spaced from the cooking top connecting the upper edges of said partitions and having a plurality of perforations; an oven having a bottom wall and side walls spaced from the said vertical partitions and extending short of said horizontal plate, the latter forming the top of such oven; a burner beneath the oven bottom; and an outlet flue connecting at the rear with the space between the cooking top and said horizontal plate; burner chambers on opposite sides of said vertical partitions each having a permanent opening communicating with said space; and burners in said chambers; said cooking top extending over said chambers and provided with lid openings.

4. The combination specified in claim 3, with the addition of baffle plates extending inwardly into the space formed between the horizontal plate and cooking top to direct the gases toward the center thereof.

5. The combination specified in claim 3, with the addition of transverse plates extending from the vertical partition outwardly and forming the bottoms respectively of the burner chambers.

6. In a stove, the combination of a cooking top having the lateral end portions each provided with a burner opening; a burner chamber beneath each such cooking top end portion; a burner in each such chamber; suitably supported upright walls respectively forming the inner walls of said burner chambers and having their upper ends below and spaced from said cooking top; a perforated plate connecting the upper ends of said upright walls and forming a horizontal space connecting said burner chambers; an outlet flue connected with said space; the connection between said space and said burner chambers being permanently open; and an oven located between said upright walls and laterally spaced therefrom, and a burner beneath said oven.

Signed by me this second day of January, 1924.

EARL V. COULSTON.